Dec. 16, 1969     R. C. RYBICKI     3,484,173

DOUBLE ACTION DAMPER BUMPER

Original Filed Dec. 20, 1966     2 Sheets-Sheet 1

INVENTOR
ROBERT C. RYBICKI

BY *M. B. Tasker*

ATTORNEY

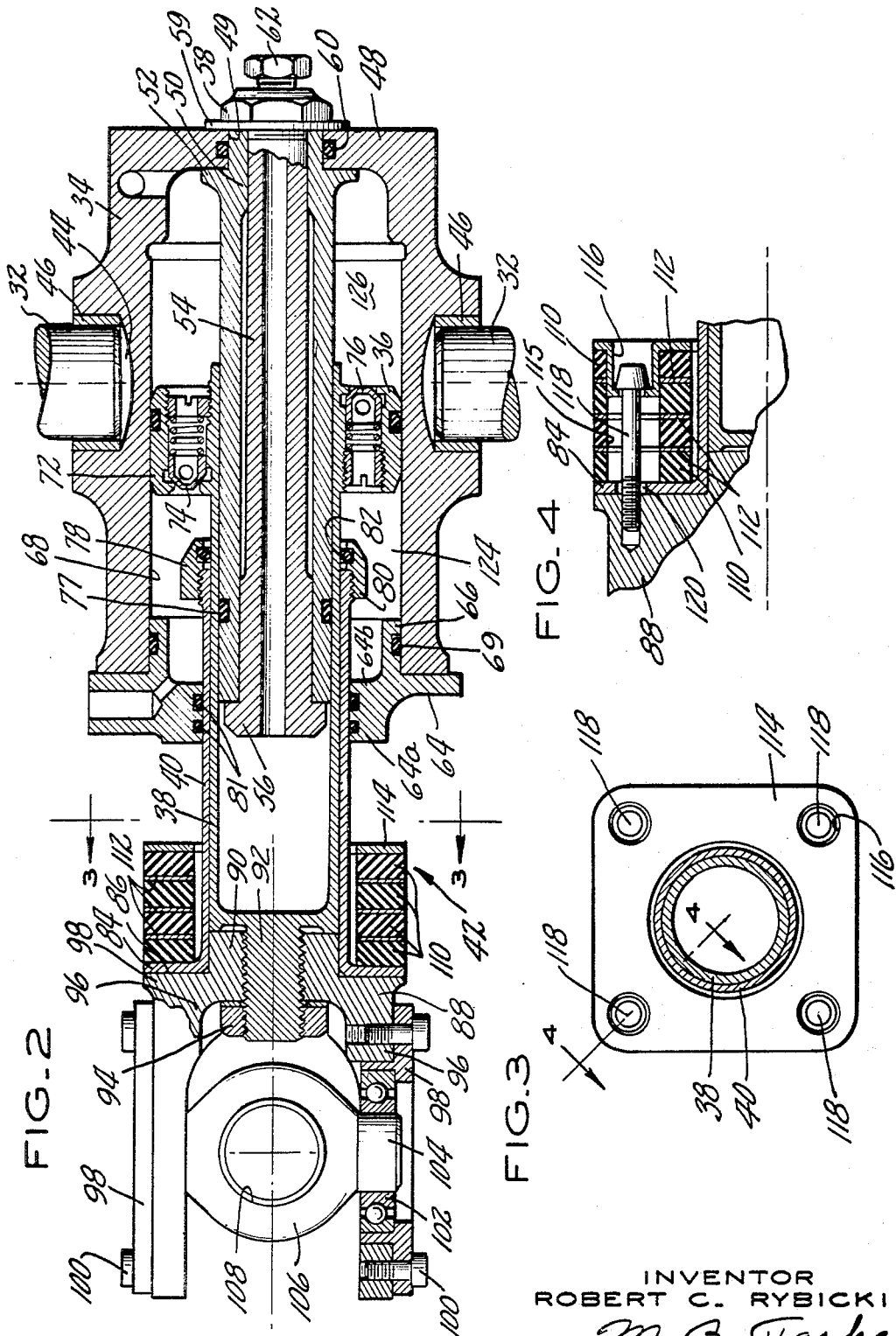

United States Patent Office 3,484,173
Patented Dec. 16, 1969

1

3,484,173
DOUBLE ACTION DAMPER BUMPER
Robert C. Rybicki, Bridgeport, Conn., assignor to United
Aircraft Corporation, East Hartford, Conn., a corporation of Delaware
Continuation of application Ser. No. 603,216, Dec. 20, 1966. This application Dec. 6, 1968, Ser. No. 796,257
Int. Cl. B64c 27/54
U.S. Cl. 416—106                                    12 Claims

ABSTRACT OF THE DISCLOSURE

Apparatus for limiting the stroke of a piston-cylinder type damper having a single resilient stop member external of the cylinder and engageable at the end of both the compressive and the tensile strokes of the damper. The stop member, carried by one damper element, engages the other element at the end of the compressive stroke. A floating sleeve on the piston rod has an abutment at one end within the cylinder in position to engage the latter near the end of the tensile stroke and a flange at its other end which then compresses the stop member.

This application is a continuation application of application Ser. No. 603,216, filed Dec. 20, 1966, now abandoned.

The invention relates to rotary wing aircraft of the type in which the rotor blades of the main sustaining rotor are pivotally mounted on a rotor hub for movement in the plane of blade rotation about generally vertical drag hinges. More particularly the invention relates to improved hydraulic dampers for controlling the lag-lead movements of the blades about their drag hinges.

Damping of the blade movements about their drag hinges is necessary to prevent ground resonance, the generation of vibrations in the blades in harmony with, and hence forced by, vibrations of the aircraft which is supported on the ground by resilient gear. These vibrations originate as a small blade oscillation and rapidly build up to a large and dangerous one which can result in breakage of the blade or the overturning of the aircraft in an incredibly short time.

In forward flight increased flapping of the blades takes place which, due to Coriolis forces, causes increased movement of the blades about their drag hinges. Also in forward flight there is a big difference in the drag forces acting on the advancing and retreating blades which results in further movements of the blades about their drag hinges. It is therefore desirable not only to damp the movements of the blades but also to provide resilient bumpers to limit the stroke of the blades about their drag hinges. These have been incorporated in the lag-lead dampers, a separate resilient stop being provided at opposite ends of the damper, one of which is engaged at the end of the compressive stroke of the damper and the other of which is engaged at the end of the tensile stroke of the damper.

This arrangement was satisfactory with three-bladed rotors, but as the number of blades in the rotor was increased to four or five it became impossible to accommodate a damper with a bumper at each end of the damper due to space limitations. It was attempted to meet this situation by installing the bumpers inside the damper cylinder. However, this proved to be objectionable because the resilient material of the bumper was then subjected to the full hydraulic pressure of the damper at the very moment when it was required to function as a bumper. This arrangement does not result in satisfactory control of the blade movements and further undesirably limits the damper stroke. As a result, five-bladed rotors have been provided with a single resilient bumper which

2 acts on the compressive stroke of the damper and the damper has been allowed to bottom metal-to-metal in the damper housing on the tensile stroke. This has resulted in high vibratory stresses in the tensile condition, and structural failures of the dampers have been experienced.

It is an object of this invention to provide a hydraulic damper for a rotor blade which has a single resilient stop, or bumper, that is compressed when the damper reaches the extreme of either its compressive or tensile stroke.

Another object of this invention is to provide a hydraulic damper for rotors of five or more blades having external bumper means operative at the end of both the compressive and tensile strokes of the damper.

A further object of this invention is to provide an energy absorbing and dissipating device operative at the end of both the compressive and tensile strokes of the damper which occupies a space and weighs no more than one which previously provided energy absorption and dissipation only at the end of the compressive stroke.

A yet further object of this invention is generally to improve the construction and operation of hydraulic dampers for rotary wing aircraft.

These and other objects and advantages of the invention will be evident or will be pointed out herein in connection with the following detailed description of a preferred embodiment of the invention shown in the accompanying drawings.

In these drawings,

FIG. 2 is a longitudinal sectional elevation of one of the improved dampers on an enlarged scale;

FIG. 3 is a sectional detail taken on line 3—3 of FIG. 2; and

FIG. 4 is a sectional detail taken on line 4—4 of FIG. 3.

Figure 1:
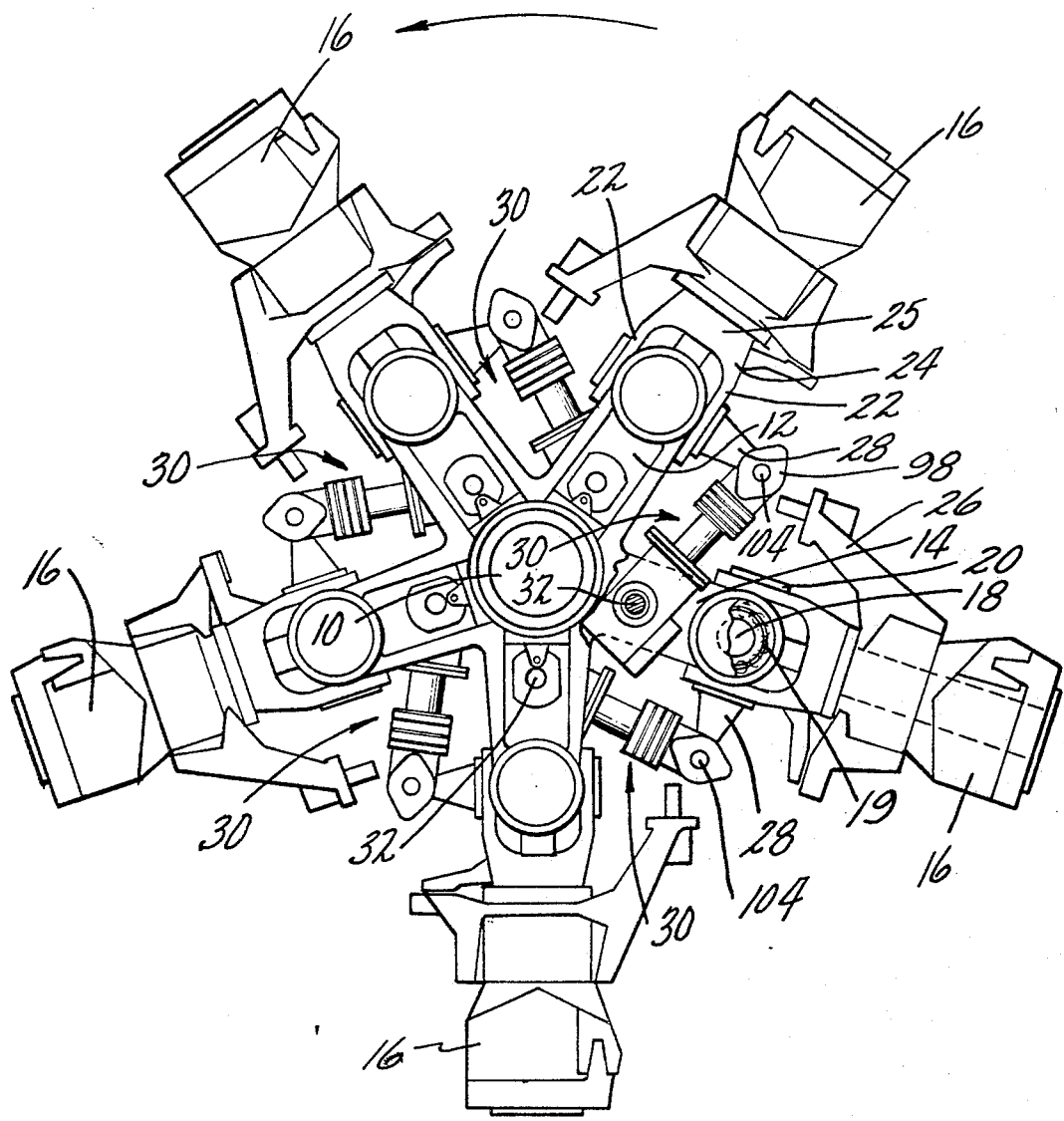
FIG. 1 is a plan view of the rotor head of a five-bladed rotary wing aircraft equipped with drag-hinge dampers of this invention, part of the hub structure being broken away in the vicinity of one blade root to show the mounting of the damper cylinder associated with an adjacent blade.

As shown in FIG. 1 a five-bladed rotor head is rotatable about a generally vertical axis of a usual rotor drive shaft 10 and includes connected upper and lower star-shaped hub plates 12 and 14. Plates 12 and 14 have five radially extending arms, one for each blade of the rotor head. The arms of the upper and lower plates are in vertical registration. Each pair of registering upper and lower plates supports an articulated rotor blade 16. Since the blades and the hub structure for mounting them are identical, only one blade and its mounting will be described herein.

At their extremities the registering arms of plates 12 and 14 have vertically aligned apertures in which a drag hinge 18 is journalled in bearings 19. The vertical drag hinge has a transverse passage, the axis of which intersects its own vertical axis, in which a flapping hinge 20 is journalled. Flapping hinge 20 is fixed in the forked ends 22 of a flapping link 24. The flapping link has an extension 25 which lies in the longitudinal axis of the blade on which the blade is journalled for pitch changing movement about its longitudinal axis as controlled by a usual pitch changing horn 26.

Flapping hinge 20 has an extension 28 to which is pivotally attached one end of a damper, generally indicated at 30. The damper is pivotally supported adjacent its other end on a pair of studs 32 fixed in the arms of the upper and lower plates 12 and 14 about midway between the drag hinge and the rotor drive shaft 10. These studs in effect form trunnions on which the damper is pivotally mounted (FIG. 2). The damper 30, with which this invention is principally concerned, is shown in detail in FIGS. 2, 3 and 4.

Referring first to FIG. 2, the damper shown is of the hydraulic type and consists essentially of a cylinder 34, a piston 36 carried by a piston rod 38, a floating sleeve 40 slidable on piston rod 38, and a resilient bumper 42. The trunnion support of the damper by studs 32 carried by the rotor hub is clearly shown in this figure, the studs being shown projecting into sockets 44 on opposite sides of the cylinder which are provided with bushings 46 to receive the studs. The cylinder head 48 at the right-hand end of the cylinder is integral with the cylinder and is provided with an axial aperture 49 to receive a guide member 50 for the piston assembly. Guide member 50 is provided with an annular flange 52 that is seated against the inner wall of the cylinder head. The guide member is held firmly in place with its flange 52 against the cylinder head by a tubular bolt 54 having a head 56 which seats on the inner end of member 50 and a clamping nut 58 which bears against a washer 59 bearing against the cylinder head 48. An O-ring packing 60 is provided in the cylinder head surrounding aperture 49 which insures a tight seal about guide member 50 where it passes through the cylinder head. The axial bore through the bolt 54 is vented by a breather valve 62.

Cylinder 34 is closed at its other end by a removable plate 64 having an annular flange 66 which enters into the inner bore 68 of the cylinder and carries an O-ring 69 which provides a fluid seal between the plate and the cylinder 34. Plate 64 has an axial aperture through which concentric piston rod 38 and sleeve 40 extend. A boss 64a is also provided on plate 64 immediately surrounding the sleeve 40 which serves as an abutment to engage a bumper hereinafter described. Piston rod 38 carries a piston 72 which has an external O-ring packing engageable with cylinder bore 68 and also carries the usual spring-pressed valves 74 and 76. Valve 74 is mounted so as to open whenever the pressure of hydraulic fluid on the left-hand side of the piston (FIG. 2) exceeds a predetermined maximum, while valve 76 is oppositely mounted so as to open whenever the pressure of fluid on the right-hand side of the piston exceeds a predetermined maximum. Piston rod 38 is tubular and has a close sliding fit on guide member 50, an O-ring packing 77 being provided between the external surface of the guide member and the internal surface of the tubular piston rod.

Sleeve 40 which has a close sliding fit on piston rod 38 carries an annular abutment member 78 on its right-hand end within the cylinder which has an annular abutment face 80 engageable with the inner surface 64b of plate 64 as the damper approaches the extended position. O-ring packings 81 and 82 are provided between sleeve 40 and plate 64 and between abutment 78 and piston rod 40, respectively. Sleeve 40 carries at its outer end an outwardly-directed square flange 84 which normally rests against the square abutment surface 86 on a fitting 88 by which piston rod 38 is secured to the blade the movements of which it controls.

Fitting 88 is square in cross section except for the axial cylindrical portion 90 which projects into the inner bore of sleeve 40 and abuts piston rod 38. The diameter of portion 90 is the same as the diameter of piston rod 38 so that sleeve 40 is free to slide over both. Fitting 88 has a threaded axial passage into which the reduced threaded portion 92 of rod 38 is threaded. The threaded end portion 92 extends beyond fitting 88 to receive a clamping nut 94.

Fitting 88 is formed with two parallel side projections 96 to which two spaced, parallel plates 98 are secured by bolts 100. Plates 98 carry bearings 102 in which trunnions 104 of a ring member 106 are journalled. Member 106 has a bushed passage 108 which lies at right angles to the axis of studs 32 and receives the extended end 28 of the flapping hinge previously referred to. The extended end 28 is threaded to receive a nut (not shown) which bears against ring member 106.

In accordance with this invention a single, resilient bumper 42 is provided external of the damper cylinder 34 which is effective to limit the movement of the blade both in the compression stroke and in the tension stroke of the damper. Herein, the bumper assembly consists of four generally square blocks 110 of resilient material, three similarly shaped spacer plates 112 to which the contiguous faces of the blocks are permanently bonded, and a generally square bumper plate 114, all provided with annular axial apertures through which the sleeve 40 is adapted to pass freely so that the tubular portion of the sleeve is at all times slightly spaced from the bumper assembly. Blocks 110 and spacers 112 have four annular passages 115, one adjacent each corner. Bumper plate 114, as shown most clearly in FIG. 4, has four depressed bolt-receiving sockets 116 which are received in passages 115. These sockets receive the heads of bolts 118 which pass freely through aligned apertures in the bottoms of sockets 116 and through blocks 110 and spacers 112. These bolts also pass freely through enlarged apertures 120 in flange 84 (FIG. 4) and are threaded into fitting 88. The blocks 110 of resilient material are not only permanently bonded to spacers 112 but the end blocks 110 of the assembly are permanently bonded to flange 84 and bumper plate 114 at their flat terminal faces.

In operation, as the rotor blade moves about its drag hinge 18 the flapping hinge including its extension 28 moves piston rod 38 and piston 36 axially in cylinder 34. Bumper 42, since it is carried by fitting 88, also moves axially with the piston rod. In the helicopter shown, the rotor turns in a counterclockwise direction as indicated by the arrow in FIG. 1. It will be seen that as the blade rotates through its advancing and retreating positions it will first lag and then lead in its movements about its drag hinge. As the blade moves counterclockwise about its drag hinge the damper piston will move toward the left in FIG. 2 in the tensile stroke of the damper. As the blade moves clockwise about its drag hinge the piston will move to the right in FIG. 2 in the compressive stroke of the damper. In both movements fluid will be compressed in one or the other of the damper chambers 124 and 126. In the tensile stroke of the damper the fluid compressed in damper chamber 124 at the left of the piston will damp the movements of the blade as fluid passes through the restricted orifice of valve 74. In the compressive stroke the fluid in damper chamber 126 at the right of the piston will damp the blade movements as fluid escapes through valve 76.

As the damper approaches the end of its compressive stroke, the annular abutment face 64a of plate 64 is engaged by bumper plate 114 of bumper 42 and the four resilient blocks 110 are compressed, thus absorbing the energy at the end of the blade movement. During this compression of resilient blocks 110 the heads of the bolts 118 will move away from their seats on bumper plate 114, but since bolts 118 are on a radius substantially larger than boss 64a, plate 64 will not be engaged by the heads of bolts 118.

In assembling the bumper 42, bolts 118 are tightened to a few inch-pounds of torque to pre-stress the bumper assembly and hold the assembly and the flange 84 of sleeve 40 firmly against fittings 88 by which the piston rod is connected to the blade.

In the tensile stroke of the damper, as the piston approaches the end of its stroke, abutment 80 on the right-hand end of sleeve 40 engages abutment face 64b on the inner face of cylinder closure plate 64, thus preventing further movement of sleeve 40 to the left (FIG. 2). As fitting 88 and the attached piston rod continue to move to the left, resilient bumper blocks 110 are compressed against flange 84 of sleeve 40 by bumper plate 114 which is connected directly to fitting 88 by bolts 118. As the blocks are compressed, the remaining energy in the moving blade is dissipated.

Summary

It will be evident that by this invention a hydraulic damper has been provided having a single resilient bumper located externally of the damper cylinder together with means for utilizing this single bumper to dissipate blade energy at the end of both the compressive and tensile strokes of the damper.

Further it will be evident that as a result of this invention it is now possible to provide this energy dissipation at the end of both damper strokes in the same space formerly occupied by a damper having a resilient bumper at the end of one stroke only, thus enabling full bumper control of dampers installed in the limited space of rotors having five or more blades.

I claim:

1. A hydraulic damper for the rotor blades of a rotary wing aircraft including relatively movable cylinder and piston elements, a resilient bumper carried by one of said elements external of said cylinder element in position to have one of its ends engage the other element at the end of the compressive stroke of the damper and compress said bumper, and an axially slidable member carried by one of said elements having abutment means at one of its ends engageable with said other element as the damper approaches the end of its tensile stroke and having means at its other end for simultaneously engaging the other end of said bumper and compressing said bumper.

2. A hydraulic damper for the rotor blades of a rotary wing aircraft including relatively movable cylinder and piston elements, said piston element including a piston rod extended through a wall of said cylinder element, a resilient bumper carried by one of said elements external of said cylinder element in position to have one of its ends engage the other element of said damper at the end of the compressive stroke of the damper and compress said bumper, and an axially slidable sleeve carried by said piston rod having abutment means within said cylinder element engageable with said wall of said cylinder element as the damper approaches the end of its tensile stroke and having a flange at its other end external of said cylinder element which engages the other end of said resilient bumper following engagement of said abutment means with said cylinder element.

3. A hydraulic damper for the rotor blades of a rotary wing aircraft including relatively movable cylinder and piston elements, said piston element including a piston rod, a resilient bumper external of said cylinder element, one end of which engages said cylinder element as the damper nears the end of its compressive stroke, a sleeve carried by and slidable on said piston rod having a flange at one of its ends external of said cylinder element and an abutment at its other end within said cylinder element engageable with the latter as the damper nears the end of its tensile stroke to move said flange against the other end of said bumper and compress the latter.

4. A hydraulic damper for the rotor blades of a rotary wing aircraft including relatively movable cylinder and piston elements, said piston element including a piston rod, a sleeve carried by and slidable on said piston rod, said sleeve having a flange on one end external of said cylinder element, and a resilient bumper carried by said piston element surrounding said sleeve between the flange on said sleeve and said cylinder element, and an abutment on the other end of said sleeve within said cylinder element which engages the latter as the damper nears the end of its tensile stroke to move said flange against said resilient bumper to compress the latter.

5. A hydraulic damper for the rotor blades of a rotary wing aircraft including a cylinder carried by the hub of the rotor, a piston rod extended into said cylinder having a piston on one end within said cylinder and a fitting on its other end by which it is attached to a blade, a resilient bumper carried by said fitting in position to engage said cylinder as the damper approaches the end of its compressive stroke, and a sleeve slidable on said piston rod also extended into said cylinder, said sleeve having an abutment at one end in said cylinder in position to engage said cylinder as the damper approaches the end of its tensile stroke and having an outstanding flange at its other end which is located between said fitting and said bumper and engages said bumper to compress the latter during the tensile stroke following the engagement of said abutment with said cylinder.

6. A hydraulic damper for the rotor blades of rotary wing aircraft including a cylinder element, a piston element including a piston rod extended into said cylinder element and a piston on said extended end, a fitting at the opposite end of said piston rod from said piston by which the piston rod is attached to a rotor blade, a sleeve slidable on said piston rod having an abutment in said cylinder in position to engage said cylinder as the damper approaches the end of its tensile stroke, said sleeve also having an outstanding flange which normally abuts said fitting, a resilient bumper assembly external of said cylinder surrounding said sleeve and abutting said flange on the opposite side of said flange from said fitting, and means including bolts extended through apertures in said bumper assembly and through said flange for supporting said bumper assembly on said fitting.

7. The damper of claim 6 in which the bumper assembly includes a plurality of resilient blocks and thin metal spacers between the blocks which surround the slidable sleeve but are spaced therefrom and a bumper plate on the face of the block adjacent the cylinder, said blocks having aligned apertures and said bumper plate having deep sockets which extend into said apertures, and said bolts having their heads in the bottoms of said sockets.

8. A helicopter rotor having a hub, a rotor blade pivoted on said hub for lag-lead movements in the plane of its rotation, a damper having relatively reciprocable cylinder and piston elements, one connected to said hub and the other to said blade for controlling said movements of said blade about its pivot, and stop means associated with said damper including a single resilient bumper carried by said piston element and interposed between said damper elements external of said cylinder element for arresting the movable element of said damper as it approaches the limit of its travel in both directions of reciprocatory movement, said cylinder element being engaged by one end of said bumper in the compressive stroke of the damper, and said stop means including a coaxial sleeve surrounding and slidable on said piston element having an abutment engageable with said cylinder element as the damper approaches the limit of its tensile stroke, said sleeve having a flange which is located outside said cylinder on the opposite side of said bumper from said cylinder element in position to engage the other end of said bumper for compressing the latter upon engagement of said abutment with said cylinder element.

9. A hydraulic damper comprising in combination, a cylinder having end closure members, a piston in said cylinder having valved passages providing controlled transfer of fluid from either side of said piston to the other side as the piston is reciprocated in said cylinder, a piston rod extended through one end closure into said cylinder for reciprocating said piston, a floating sleeve surrounding said rod having one end extended into said cylinder, an abutment carried by the extended end of said sleeve in position to engage the adjacent end closure of said cylinder as the damper approaches the end of its tensile stroke, said sleeve having a flange external of said cylinder, and a bumper fixed to said piston rod and disposed between said flange and the adjacent end closure for said cylinder in position to be engaged by said end closure as the damper approaches the end of its compressive stroke and by said flange as said abutment engages the end plate of said cylinder.

10. A helicopter rotor having a hub, a rotor blade pivoted on said hub for lag-lead movements in the plane of its rotation, a damper having relatively reciprocable cylinder and piston elements, one connected to said hub and the other to said blade for controlling said movements of the blade about its pivot, stop means associated with said damper including a single resilient bumper interposed between said damper elements external of said cylinder element, and means actuated by the movable element of said damper for compressing said bumper and arresting said movable element as said damper approaches the limit of its travel in both directions of reciprocatory movement.

11. A hydraulic damper for the rotor blades of rotary wing aircraft including relatively movable cylinder and piston elements, first and second mutually reciprocable compression means external of said cylinder element, one associated with each of said elements, a resilient bumper interposed between said compression means in position to have one of its ends engage the compression means of one of said elements and compress said bumper as said damper approaches the end of its compressive stroke, and means actuated by said movable element for engaging the other end of said bumper by the other of said compression means to compress said bumper as said damper approaches the end of its tensile stroke.

12. A hydraulic damper for the rotor blades of rotary wing aircraft including relatively movable cylinder and piston elements, a resilient bumper carried by one of said elements externally of said cylinder elements, an abutment located adjacent one end of said bumper, a second abutment located adjacent the opposite end of said bumper, said bumper having one of its ends engaged by one of said abutments to compress said bumper as said movable element approaches the end of its compressive stroke, and means operatively connecting said other abutment with said movable element for effecting engagement of said other abutment with the other end of said bumper to compress the latter as said damper approaches the end of its tensile stroke.

References Cited

UNITED STATES PATENTS

| | | | |
|---|---|---|---|
| 2,554,774 | 5/1951 | Buivid | 170—160.55 |
| 2,774,553 | 12/1956 | Jensen | 170—160.55 X |
| 3,047,162 | 7/1962 | Blake. | |

FOREIGN PATENTS

| | | |
|---|---|---|
| 550,961 | 12/1922 | France. |
| 787,848 | 12/1957 | Great Britain. |

EVERETTE A. POWELL, JR., Primary Examiner

U.S. Cl. X.R.

188—88; 416—500